United States Patent
Kawaguchi et al.

(10) Patent No.: US 8,994,502 B2
(45) Date of Patent: Mar. 31, 2015

(54) RFID DEVICES, SYSTEMS AND METHODS FOR ACCURATE EQUIPMENT AND ASSET TRACKING

(75) Inventors: Dean Kawaguchi, San Jose, CA (US); Edward M. Farrell, Saratoga, CA (US); Edmond Sardariani, San Jose, CA (US); Peter Arnold Mehring, Los Altos, CA (US)

(73) Assignee: Intelleflex Corporation, Santa Clara, CA (US)

(*) Notice: Subject to any disclaimer, the term of this patent is extended or adjusted under 35 U.S.C. 154(b) by 316 days.

(21) Appl. No.: 13/411,406

(22) Filed: Mar. 2, 2012

(65) Prior Publication Data
US 2012/0223814 A1  Sep. 6, 2012

Related U.S. Application Data

(60) Provisional application No. 61/448,613, filed on Mar. 2, 2011.

(51) Int. Cl.
*G06K 7/01* (2006.01)
*G06Q 10/08* (2012.01)
*G06Q 50/28* (2012.01)
*G06K 17/00* (2006.01)

(52) U.S. Cl.
CPC ............ *G06Q 10/0833* (2013.01); *G06Q 50/28* (2013.01); *G06K 2017/0051* (2013.01)
USPC ........................................ 340/10.1; 340/572.1

(58) Field of Classification Search
CPC ........................................................ G06K 7/01
USPC .............. 340/10.1, 572.1, 545.6, 539.13, 8.1
See application file for complete search history.

(56) References Cited

U.S. PATENT DOCUMENTS

| | | | |
|---|---|---|---|
| 2004/0148117 A1* | 7/2004 | Kirshenbaum et al. | 702/82 |
| 2004/0179049 A1* | 9/2004 | Phillips | 347/7 |
| 2006/0080819 A1* | 4/2006 | McAllister | 29/403.3 |
| 2006/0267777 A1* | 11/2006 | Moore | 340/572.8 |
| 2010/0065647 A1 | 3/2010 | Ritamaki et al. | |

* cited by examiner

*Primary Examiner* — Edwin Holloway, III
(74) *Attorney, Agent, or Firm* — Zilka-Kotab, PC

(57) ABSTRACT

A method according to one embodiment includes conummicating with a radio frequency identification (RFID) tag coupled to a reusable transport item (RTI); and determining whether the RTI has passed a predetermined useful lifetime thereof based on information received from the RFID tag. A method according to one embodiment includes conummicating with a radio frequency identification (RFID) tag coupled to a reusable transport item (RTI); and determining both a horizontal and vertical position of the RTI. A method according to yet another embodiment includes communicating with a radio frequency identification (RFID) tag coupled to a reusable transport item (RTI); and performing an action based at least in part on at least one of a location and a determined inactivity of the RTI.

20 Claims, 2 Drawing Sheets

— 1 —

RFID DEVICES, SYSTEMS AND METHODS FOR ACCURATE EQUIPMENT AND ASSET TRACKING

RELATED APPLICATION

This application claims priority to U.S. Provisional Patent Appl. No. 61/448,613, filed Mar. 2, 2011, and which is herein incorporated by reference.

FIELD OF THE INVENTION

The present invention relates to Radio Frequency (RF) systems, and more particularly, this invention relates to Radio Frequency Identification (RFID) systems, methods and products for tracking.

BRIEF SUMMARY

A method according to one embodiment includes communicating with a radio frequency identification (RFID) tag coupled to a reusable transport item (RTI); and determining whether the RTI has passed a predetermined useful lifetime thereof based on information received from the RFID tag.

A method according to one embodiment includes communicating with a radio frequency identification (RFID) tag coupled to a reusable transport item (RTI); and determining both a horizontal and vertical position of the RTI.

A method according to yet another embodiment includes communicating with a radio frequency identification (RFID) tag coupled to a reusable transport item (RTI); and performing an action based at least in part on at least one of a location and a determined inactivity of the RTI.

A system according to one embodiment includes an RFID reader for communicating with a radio frequency identification (RFID) tag coupled to a reusable transport item (RTI); and logic for performing any of the foregoing methods.

Other aspects and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

— 2 —

It must also be noted that, as used in the specification and the appended claims, the singular forms "a," "an" and "the" include plural referents unless otherwise specified.

In one general embodiment, a method includes conummicating with a radio frequency identification (RFID) tag coupled to a reusable transport item (RTI); and determining whether the RTI has passed a predetermined useful lifetime thereof based on information received from the RFID tag.

In another general embodiment, a method includes communicating with a radio frequency identification (RFID) tag coupled to a reusable transport item (RTI); and determining both a horizontal and vertical position of the RTI.

In yet another general embodiment, a method includes communicating with a radio frequency identification (RFID) tag coupled to a reusable transport item (RTI); and performing an action based at least in part on at least one of a location and a determined inactivity of the RTI.

In one general embodiment, a system includes an RFID reader for communicating with a radio frequency identification (RFID) tag coupled to a reusable transport item (RTI); and logic for performing any of the foregoing methods.

Figure 1:
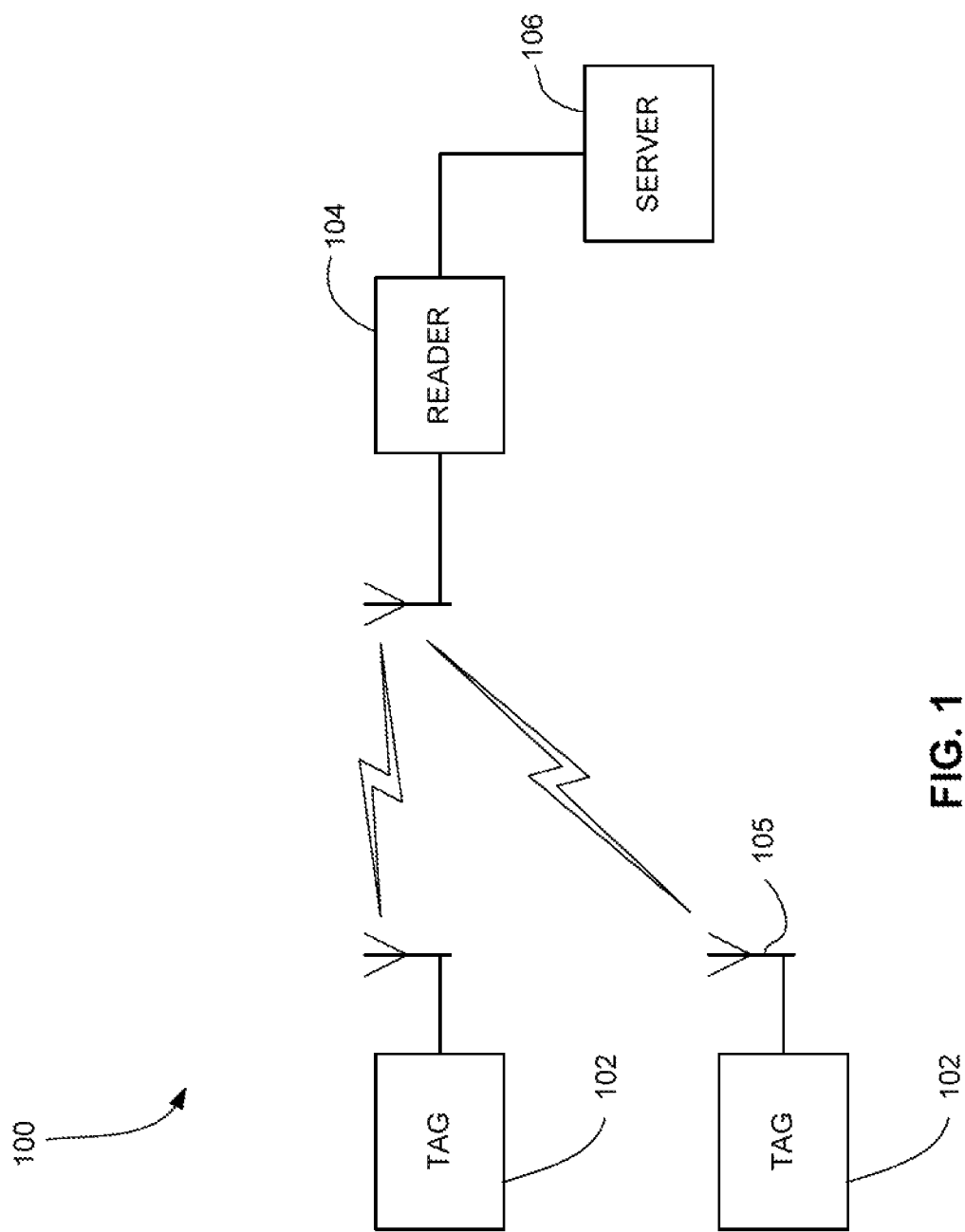
FIG. 1 is a system diagram of an RFID system.

FIG. 1 depicts an RFID system 100 according to one of the various embodiments, which may include some or all of the following components and/or other components. As shown in FIG. 1, one or more RFID devices 102 are present. Each RFID device 102 in this embodiment includes a controller and memory, which are preferably embodied on a single chip as described below, but may also or alternatively include a different type of controller, such as an application specific integrated circuit (ASIC), processor, an external memory module, etc. For purposes of the present discussion, the RFID devices 102 will be described as including a chip. Each RFID device 102 may further include or be coupled to an antenna 105.

An illustrative chip is disclosed below, though actual implementations may vary depending on how the device is to be used. In general terms, a preferred chip includes one or more of a power supply circuit to extract and regulate power from the RF reader signal; a detector to decode signals from the reader; a backscatter modulator and/or transmitter to send data back to the reader; anti-collision protocol circuits; and at least enough memory to store its unique identification code, e.g., Electronic Product Code (EPC).

While RFID devices 102 according to some embodiments are functional RFID tags, other types of RFID devices 102 include merely a controller with on-board memory, a controller and external memory, etc.

Each of the RFID devices 102 may be coupled to an object or item, such as an article of manufacture, a container, a device, a person, etc.

With continued reference to FIG. 1, a remote device 104 such as an interrogator or "reader" communicates with the RFID devices 102 via an air interface, preferably using standard RFID protocols. An "air interface" refers to any type of wireless communications mechanism, such as the radio-frequency signal between the RFID device and the remote device. The RFID device 102 executes the computer commands that the RFID device 102 receives from the reader 104.

The system 100 may also include an optional backend system such as a server 106, which may include databases containing information and/or instructions relating to RFID tags and/or tagged items.

As noted above, each RFID device 102 may be associated with a unique identifier. Such identifier is preferably an EPC code. The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN.UCC System Keys, UID, VIN, and other numbering systems. Like many current numbering schemes used in commerce, the EPC is divided into numbers that identify the manufacturer and product type. In addition, the EPC uses an extra set of digits, a serial number, to identify unique items. A typical EPC number contains:

1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged.

Additional fields may also be used as part of the EPC in order to properly encode and decode information from different numbering systems into their native (human-readable) forms.

Each RFID device 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases do not reside on the tag, but rather are linked to the tag through a unique identifier(s) or reference key(s).

RFID systems may use reflected or "backscattered" radio frequency (RF) waves to transmit information from the RFID device 102 to the remote device 104, e.g., reader. Since passive (Class-1 and Class-2) tags get all of their power from the reader signal, the tags are only powered when in the beam of the reader 104.

The Auto ID Center EPC-Compliant tag classes are set forth below:

Class-1
Identity tags (RF user programmable, range ~3 m)
Lowest cost
Class-2
Memory tags (20 bit address space programmable at ~3 m range)
Security & privacy protection
Low cost
Class-3
Semi-passive tags (also called semi-active tags and battery assisted passive (BAP) tags)
Battery tags (256 bits to 2M words)
Self-Powered Backscatter (internal clock, sensor interface support)
~100 meter range
Moderate cost
Class-4
Active tags
Active transmission (permits tag-speaks-first operating modes)
~300 to ~1,000 meter range
Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (e.g., semi-active, semi-passive or battery-assisted), batteries are the most common form of power. This greatly increases read range, and the reliability of tag reads, because the tag does not need power from the reader to respond. Class-3 tags only need a 5 mV signal from the reader in comparison to the 500 mV that Class-1 and Class-2 tags typically need to operate. This 100:1 reduction in power requirement along with the reader's ability to sense a very small backscattered signal permits Class-3 tags to operate out to a free space distance of 100 meters or more compared with a Class-1 range of only about 3 meters. Note that semi-passive and active tags with built in passive mode may also operate in passive mode, using only energy captured from an incoming RF signal to operate and respond, at a shorter distance up to 3 meters.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. Ultra high-frequency (860 MHz to 960 MHz and 2.4 GHz to 2.5 GHz) tags offer increased read ranges and high reading speeds.

A basic RFID communication between an RFID device and a remote device typically begins with the remote device, e.g., reader, sending out signals via radio wave to find a particular RFID device, e.g., tag via singulation or any other method brown in the art. The radio wave hits the RFID device, and the RFID device recognizes the remote device's signal and may respond thereto. Such response may include exiting a hibernation state, sending a reply, storing data, etc.

Figure 2:
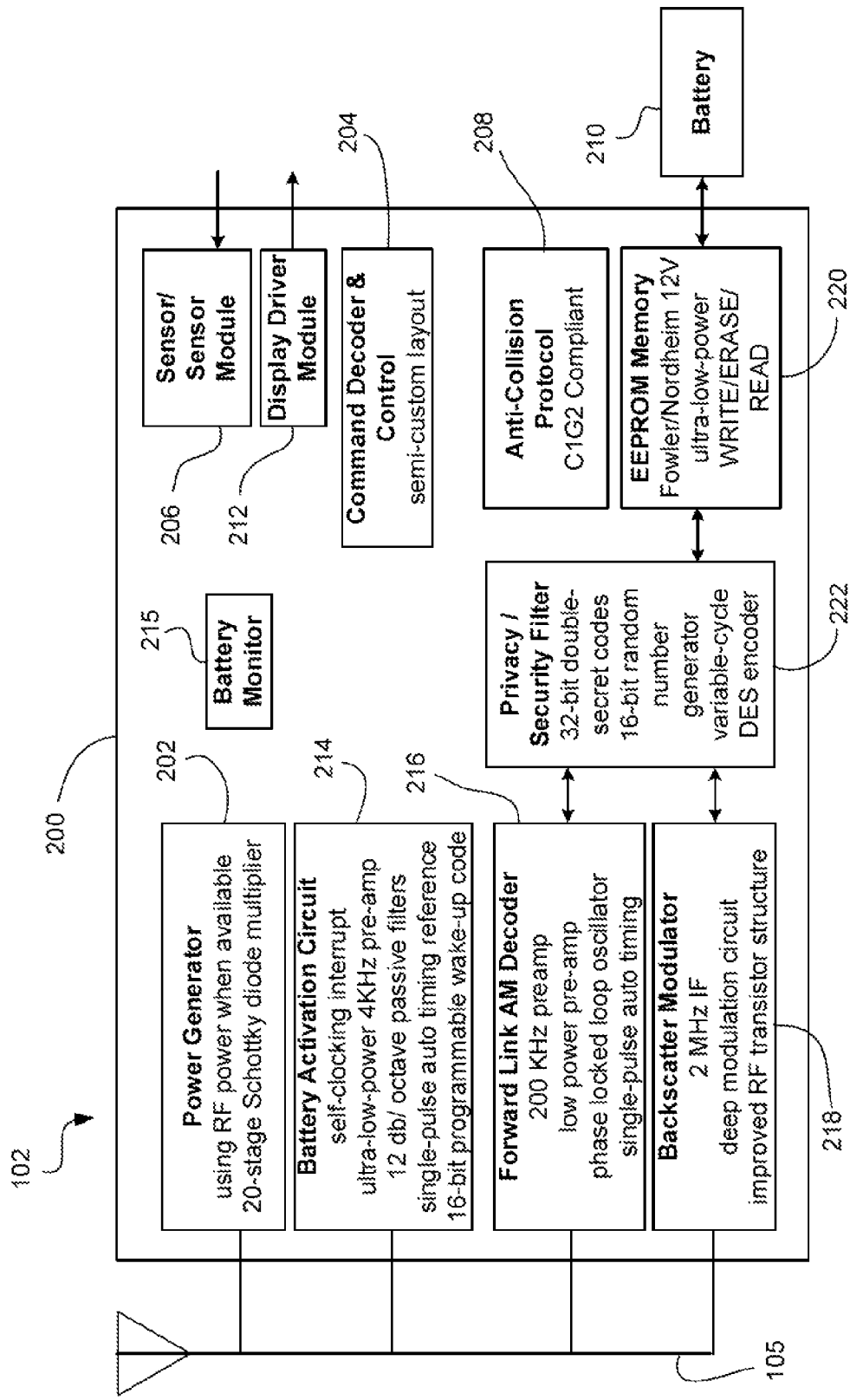
FIG. 2 is a system diagram for an illustrative integrated circuit (IC) chip for implementation in an RFID device.

Embodiments of the RFID device are preferably implemented in conjunction with a Class-3 or higher Class IC chip, which typically contains the processing and control circuitry for most if not all tag operations. FIG. 2 depicts a circuit layout of a Class-3 IC 200 and the various control circuitry according to an illustrative embodiment for implementation in an RFID tag 102. It should be kept in mind that the present invention can be implemented using any type of RFID device, and the circuit 200 is presented as only one possible implementation.

The Class-3 IC of FIG. 2 can form the core of RFID chips appropriate for many applications such as identification of pallets, cartons, containers, vehicles, or anything where a range of more than 2-3 meters is desired. As shown, the chip 200 includes several circuits including a power generation and regulation circuit 202, a digital command decoder and control circuit 204, a sensor or sensor interface module 206, a C1G2 interface protocol circuit 208, and a power source (battery) 210. A display driver module 212 can be added to drive a display.

A forward link AM decoder 216 uses a simplified phase-lock-loop oscillator that requires only a small amount of chip area. Preferably, the circuit 216 requires only a minimum string of reference pulses.

A backscatter modulator block 218 preferably increases the backscatter modulation depth to more than 50%.

A memory cell, e.g., EEPROM, is also present, and preferably has a capacity from several kilobytes to one megabyte or more. In one embodiment, a pure, Fowler-Nordheim direct-tunneling-through-oxide mechanism 220 is present to reduce both the WRITE and ERASE currents to about 2 µA/cell in the EEPROM memory array. Unlike any RFID tags built to date, this permits reliable tag operation at maximum range even when WRITE and ERASE operations are being performed. In other embodiments, the WRITE and ERASE currents may be higher or lower, depending on the type of memory used and its requirements.

Preferably, the amount of memory available on the chip or otherwise is adequate to store data such that the external device need not be in active communication with the remote device.

The module 200 may also incorporate a security encryption circuit 222 for operating under one or more security schemes, secret handshakes with readers, etc.

The RFID device may have a dedicated power supply, e.g. battery; may draw power from a power source of the electronic device (e.g., battery, AC adapter, etc.); or both. Further, the RFID device may include a supplemental power source. Note that while the present description refers to a "supplemental" power source, the supplemental power source may indeed be the sole device that captures energy from outside the tag, be it from solar, RF, kinetic, etc. energy.

In various embodiments, RFID technology may be used for a variety of applications including security access, entrance/exit monitoring, high value asset monitoring, etc. One particularly useful application is for use with a reusable transport item (RTI). An RTI may be any piece of equipment which aids in the movement of materials and/or equipment, which may be reused in another movement operation. For example, crates, boxes, bins, containers, pallets, roll cages, tanks, etc., may all be considered RTIs.

A method according to one embodiment includes communicating with an RFID tag coupled to a RTI, and determining both a horizontal and vertical location of the RTI. Known methods such as triangulation, proximity detection etc. may be modified and/or combined to determine the horizontal and vertical position of the RTI. In one approach, multiple RFID readers and/or antennae may be placed throughout a facility in order to precisely and accurately monitor and track movements of RTI throughout the facility. In another approach, RFID readers and/or antennae may be placed in rooms on each floor of a building, at various horizontal and vertical positions in a single room, etc., thereby allowing three dimensional tracking of RTI, e.g., in the building across the multiple floors of the building and/or at about a particular height in a room. In another embodiment, RFID readers and/or antennae may be placed across various facilities, such as airports, train stations, shipping warehouses, ports, etc., such that RTI which are used by multiple entities at multiple locations may be tracked consistently throughout their usage.

An action may be performed based at least in part on the determined horizontal and/or vertical position of the RTI. In one approach, the action may include the sending of a message with a request or instructions to move the RTI to a location different than its present location. For example, if the RTI is in the wrong area or position, such as on the wrong floor, on the wrong shelf, or in the wrong room, a request can be sent to move the RTI to the proper location. Preferably, the request includes data about the present location of the RTI, and/or the desired location. For example, the data about the present location may include horizontal and/or vertical coordinates; an identity of surrounding features, such as a floor number, a room number, a shelf number, etc.; etc.

In some approaches, the action may be performed based also at least in part on a determined inactivity of the RTI. Such inactivity may be determined by a time period elapsed since the RTI was last moved, e.g., as determined by information stored in the tag; data stored on the tag that the RTI has completed its task; etc.

In a further approach, a determination may be made as to whether the RTI has passed a predetermined useful lifetime thereof based on information received from the RFID tag. More information regarding such an approach is provided below.

In one example, a crate may be loaded with medical supplies at a manufacturing plant, loaded onto a railcar at a rail yard near the manufacturing plant, then delivered to an airport, where it is loaded onto an airplane for transport to another airport, then placed in a delivery truck and delivered to a hospital, possibly thousands of miles away from where it was first manufactured. During this whole process, from placement into the crate to unpacking at the hospital, the location of the medical supplies may be known, along with the location of the crate due to strategic placement of RFID readers and/or antennae along the path of movement.

In one general embodiment, a method includes communicating with a RFID tag coupled to the RTI, and performing an action based at least in part on at least one of a location and a determined inactivity of the RTI. For example, continuing with the illustrative embodiment in the previous paragraph, after unpacking of the crate, the RFID tag may then indicate that the crate is empty and sitting in the storage room of the hospital. Accordingly, a request may be sent to the hospital to return the crate so that it may be used for future deliveries, possibly to other facilities not related to the hospital and filled with something other than medical supplies.

The location of the RTI may be determined from information stored on the RFID tag, e.g., location information written to the tag when the tag was moved to or en route to its present location, and the action performed based at least in part on the determined location of the RTI. In another approach, known positioning methods such as triangulation, proximity detection, etc. may be used. As noted above, both the horizontal and vertical position of the RTI may be performed, the action performed based at least in part on such location of the RTI.

In one approach the action includes the sending of a message with a request or instructions to move the RTI to a location different than its present location. Preferably, the request includes data about the present location of the RTI, and/or the desired location. For example, the data about the present location may include horizontal and/or vertical coordinates; an identity of surrounding features, such as a floor number, a room number, a shelf number, etc.; etc.

In another approach, the action is performed after determining that the RTI has not been returned to a predetermined location that is different than the present location of the RTI.

In yet another embodiment, the action is performed based on the determined inactivity of the RTI. Such inactivity may be determined by a time period elapsed since the RTI was last moved, e.g., as determined by information stored in the tag; data stored on the tag that the RTI has completed its task; etc.

In another embodiment, RTI, such as pallets, may have a predetermined lifetime during which it is considered that they are useful. This lifetime may be based on distance traveled, tune in service, type of equipment carried, etc., or any combination thereof. It is difficult to accurately determine if any of these parameters have been met for each individual RTI, but if RFID tags are installed on each RTI, then a precise determination can be made as to whether the RTI should be replaced, where it is at any given time, and how best to allocate the RTI in order to fulfill movement operations in the short and long term. This saves on replacement costs for RTI which have not reached the end of their usefulness, and also helps to prevent accidents and the costs that are associated with them that may occur due to using RTI which have outlasted their usefulness, and happen to breakdown, fail, or otherwise perform their functions at less than 100%.

Accordingly, a method according to one general embodiment includes communicating with a RFID tag coupled to a RTI, and determining whether the RTI has passed a predetermined useful lifetime thereof based on information received from the RFID tag. The determining may be based on one or more factors, such as a distance that the RTI has traveled, a time the RTI has been in service, types of goods carried by the RTI, known damage to the RTI, service locations (such as in a corrosive environment such as the ocean) and length of time in such locations, etc. and combinations thereof.

In one approach, such information is stored in a memory of the RFID tag. The information may be written to the tag memory as the tag progresses through its life. This approach is favored, as the RTI lifetime can be readily determined anywhere in the world by using information stored on the tag. In another approach, the estimated remaining lifetime may be stored on the tag.

In another approach, the information may be retrieved from a database having such information stored in association with an identifier of the tag.

In one embodiment, a method includes some or all of the steps set forth herein.

A system according to various embodiments may include an RFID reader for communicating with the tag coupled to a reusable transport item RTI, and logic for performing some or all of the operations disclosed herein in any combination.

Elements from US Patent App. Pub. No. 2010/0065647A1 to Ritamaki et al., which is herein incorporated by reference, may be used in any of the embodiments presented herein.

In any of the embodiments, techniques and/or hardware known in the art may be used to implement the various operations.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein may be implemented using the Internet as a means of conununicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In particular, methods described herein may be implemented by a series of computer-executable instructions residing on a storage medium such as a physical computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a physical computer readable medium having computer code thereon. A computer readable medium can include any physical medium capable of storing computer code thereon for use by a computer, including optical media such as read only and writeable CD and DVD, magnetic memory or medium (e.g., hard disk drive), semiconductor memory (e.g., FLASH memory and other portable memory cards, etc.), etc. A computer readable medium may also include a signal medium such as a wire, network link, wireless link, etc. across which data and/or instructions may be transmitted.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   communicating with a radio frequency identification (RFID) tag coupled to a reusable transport item (RTI);
   determining whether the RTI has passed a predetermined useful lifetime thereof based on information received from the RFID tag; and
   performing an action based at least in part on a determined inactivity of the RTI.

2. The method of claim 1, wherein the determining is based on at least one of a distance that the RTI has travelled, the inactivity of the RTI, and a type of goods carried by the RTI.

3. The method of claim 1, wherein the information is stored in a memory of the RFID tag, wherein the information includes location information written to the tag when the tag was moved to and/or en route to its present location.

4. The method of claim 1, further comprising performing the action based at least in part on a location of the RTI.

5. The method of claim 4, further comprising determining both a horizontal and vertical position of the RTI, and performing the action based at least in part on the determined location of the RTI.

6. A system, comprising:
   an RFID reader for communicating with a radio frequency identification (RFID) tag coupled to a reusable transport item (RTI); and
   logic for performing the method of claim 1.

7. A method, comprising:
   communicating with a radio frequency identification (RFID) tag coupled to a reusable transport item (RTI);
   determining both a horizontal and vertical position of the RTI; and
   performing an action based at least in part on a determined inactivity of the RTI.

8. The method of claim 7, wherein performing the action is further based at least in part on determining that the RTI has not been returned to a predetermined location that is different than the determined location of the RTI.

9. The method of claim 7, wherein the action includes the sending of a message with a request or instructions to move the RTI to a location different than its present location, wherein the request includes an identity of features surrounding the RTI.

10. The method of claim 7, wherein performing the action is further based at least in part on information stored in the RFID tag, wherein the information includes location information written to the tag when the tag was moved to and/or en route to its present location.

11. The method of claim 7, further comprising determining whether the RTI has passed a predetermined useful lifetime thereof based on information received from the RFID tag.

12. A system, comprising:
an RFID reader for communicating with a radio frequency identification (RFID) tag coupled to a reusable transport item (RTI); and
logic for performing the method of claim 7.

13. A method, comprising:
communicating with a radio frequency identification (RFID) tag coupled to a reusable transport item (RTI); and
performing an action based at least in part on a determined inactivity of the RTI.

14. The method of claim 13, further comprising determining a location of the RTI from information stored on the RFID tag, and performing the action based at least in part on the determined location of the RTI.

15. The method of claim 13, further comprising determining both a horizontal and vertical position of the RTI, and performing the action based at least in part on the determined location of the RTI.

16. The method of claim 13, wherein the action includes sending a message with a request or instructions to move the RTI to a location different than its present location.

17. The method of claim 13, wherein the action is performed after determining that the RTI has not been returned to a predetermined location that is different than a present location of the RTI.

18. The method of claim 13, wherein the inactivity of the RTI is determined based on information received from the RFID tag.

19. The method of claim 13, further comprising determining whether the RTI has passed a predetermined useful lifetime thereof based on information received from the RFID tag.

20. A system, comprising:
an RFID reader for communicating with a radio frequency identification (RFID) tag coupled to a reusable transport item (RTI); and
logic for performing the method of claim 13.

* * * * *